(12) United States Patent
Holdener et al.

(10) Patent No.: US 6,384,990 B1
(45) Date of Patent: May 7, 2002

(54) TWO POSITION OPTICAL ELEMENT ACTUATOR DEVICE

(75) Inventors: Fred R. Holdener, Tracy; Robert D. Boyd, Livermore, both of CA (US)

(73) Assignee: The United States of America, as represented by the Department of Energy, Washington, DC (US)

( * ) Notice: Subject to any disclaimer, the term of this patent is extended or adjusted under 35 U.S.C. 154(b) by 68 days.

(21) Appl. No.: 09/667,224

(22) Filed: Sep. 21, 2000

Related U.S. Application Data

(63) Continuation-in-part of application No. 09/418,477, filed on Oct. 15, 1999, now Pat. No. 6,144,506.

(51) Int. Cl.$^7$ ................................................. G02B 7/02
(52) U.S. Cl. .................... 359/812; 359/811; 359/813; 359/814; 359/817; 359/822; 359/827
(58) Field of Search ........................... 359/812, 811, 359/813, 814, 817, 822, 827, 821, 823, 694; 353/76, 101; 350/255

(56) References Cited

U.S. PATENT DOCUMENTS

| | | | |
|---|---|---|---|
| 1,967,161 A | 7/1934 | Simon | .......................... 353/76 |
| 3,675,559 A | 7/1972 | Freeland | .......................... 95/44 |
| 4,146,315 A | 3/1979 | Pribich | .......................... 353/76 |
| 5,742,441 A | 4/1998 | Grassens et al. | ............. 359/822 |
| 6,220,251 B1 * | 4/2001 | Jeong et al. | ............... 132/73.5 |
| 6,314,681 B1 * | 11/2001 | Moody | .......................... 49/343 |

* cited by examiner

Primary Examiner—Georgia Epps
Assistant Examiner—Tim Thompson
(74) Attorney, Agent, or Firm—Randall W. Chang; William C. Daubenspeck; Virginia B. Caress

(57) ABSTRACT

The present invention is a two position optical element actuator device utilizing a powered means to hold an actuation arm, to which an optical element is attached, in a first position. A non-powered means drives the actuation arm to a second position, when the powered means ceases to receive power. The optical element may be a electromagnetic (EM) radiation or particle source, an instrument, or EM radiation or particle transmissive, reflective or absorptive elements. A bearing is used to transfer motion and smoothly transition the actuation arm from the first to second position.

23 Claims, 8 Drawing Sheets

TWO POSITION OPTICAL ELEMENT ACTUATOR DEVICE

CROSS-REFERENCE TO RELATED APPLICATIONS

This application is a continuation-in-part of U.S. application Ser. No. 09/418,477, filed Oct. 15, 1999, now U.S. Pat. No. 6,144,506.

STATEMENT OF GOVERNMENT INTEREST

The United States Government has rights in this invention pursuant to Contract No. W-7405-END-48 between the United States Department of Energy and the University of California for Management of the Lawrence Livermore National Laboratory.

BACKGROUND OF THE INVENTION

The present invention relates generally to optical actuator positioning devices, and particularly to two position optical actuator devices.

Description of Related Art

It is known in the art of positioning devices to move an optical element into and out of the path of a beam of electromagnetic radiation or particles, or to position a source such as a laser with respect to a target. However there is a need for a device wherein at the end of the optical element's travel there is a minimum of vibration experienced by the optical element. Furthermore, for safety considerations, there is a need for a device which moves the optical element from a first position to a second position by means without the use of power, when the optical element is no longer restrained in the first position, such as when power to the device is cut or lost. For example, there is a need for an optical shutter system which moves a shield into the path of a beam line when power is lost. In other applications, there is a need for a device that can position a source emitting electromagnetic radiation or particles. This would be useful for positioning beam sources such as lasers or particle beam sources. For example, if the beam is focused on a target, moving the beam in the event of a power failure could prevent damage to the target. Such a device would also be useful where the flux emitted is not focused, such as in a radioactive sample being analyzed. For example, it would be useful to be able to move the source behind shielding in the event of a power failure. Where an instrument is being used to measure EM radiation or particles, it would useful for such a device to be able to move the instrument out of the flux in the event of a power failure so as to protect the instrument from damage.

SUMMARY OF THE INVENTION

It is therefore an object of the present invention to provide a two position optical actuator device that does not require power to move an optical element from a first position to a second position when the restraining means ceases to hold the optical element in the first position. Such situations include but are not limited to when the restraining means ceases to receive power, a malfunction or failure of the restraining means, or scenario where the restraining means loses contact with the driver bar.

It is a further object of the present invention to provide a two position optical actuator device that imparts a minimum amount of vibration to an optical element when the optical element is moved from a first to second position.

It is a further object of the present invention to provide a two position optical actuator device that can move a variety of optical elements, including EM radiation or particle sources, EM radiation or particle instruments, elements capable of reflecting, absorbing or transmitting EM radiation or particles, and targets or workpieces upon which the EM radiation or particles will act.

According to one aspect of the present invention, there is provided a two position optical actuator device, comprising a mounting base; an actuation arm having a first end, a second end, and a middle region, said middle region being rotatably connected to said mounting base, said first end including an elongated opening, said second end having an attached optical element; a driver bar for driving said actuation arm between actuation arm first and second positions, said driver bar having a first end rotatably connected to said mounting base and a second end on which is mounted a bearing for engaging and traveling within said elongated opening, so that when said driver bar pivots in a given direction said actuation arm is driven in an opposite rotational direction by said bearing; powered means for holding said driver bar in a driver bar first position which maintains said actuation arm in said actuation arm first position (and optical element first position); and non-powered means for moving said driver bar to a driver bar second position when said driver bar is not restrained by said powered means, so that said actuation arm is driven to said actuation arm second position (optical element second position). The optical element may be a source, an instrument, an element capable of reflecting, transmitting or absorbing EM radiation or particles, or a target or workpiece upon which EM radiation or particles impinge.

According to another aspect of the present invention the optical element interacts with the flux from a source (preferably a beam source) of EM radiation or particles. In one aspect, the optical element is initially held outside of the path of the flux by the powered means. The optical element is moved into the beam's path by the non-powered means when the driver bar is not restrained by the powered means. In another aspect the optical element is initially held in the path of the beam by the powered means. The optical element is moved out of the beam's path by the non-powered means when the powered means ceases to receive power.

In a further aspect of the present invention, the optical element is a source (preferably beam source) of EM radiation or particles, in which at least a portion of whose emission impinges upon a second optical element. In one aspect, the second optical element receives flux from the source when the driver bar is in the first position, and none when the driver bar is in the second position. In another aspect, the second optical element receives no flux in the driver bar first position, and flux in the driver bar second position.

Other objects and features of the present invention will be apparent from the following detailed description of the present invention.

DETAILED DESCRIPTION OF THE INVENTION

Definitions beam source—a source emitting a beam of particles or electromagnetic (EM) radiation directed in a particular direction.

EM radiation—electromagnetic radiation instrument—an instrument capable of measuring, sensing or detecting EM radiation or particles non-powered means—means to apply a driving force to the driver bar by which the driver bar is moved from a first position to a second position without the need for said means to receive power.

opposite rotational direction—simultaneous motion by the driver bar and the actuation arm, such that the end of the driver bar including the bearing and the end of the actuation arm including the elongated slot pivot along opposing arcs.

optical element—a) a source emitting EM radiation or particles; b) an instrument to measure or detect EM radiation or particles; c) an element capable of reflecting, transmitting or absorbing EM radiation or particles. Examples of such elements include but are not limited to shields, mirrors, lenses, filters, collimators, absorbing glass, polarizers, polarization rotating elements, prisms, and alignment fiducials; d) an item desired to interact with a source emitting EM radiation or particles, including a workpiece whose material properties (surface and/or bulk) are modified.

particles—subatomic, atomic or molecular particles, in either charged or neutral states.

power source—a device or connection that supplies electric current, or other type of power, to the restraining means. The power source may be alternating or direct current at a variety of strengths (voltages). Other sources of power may include hydraulic and pneumatic.

powered means—means to apply a restraining force to the driver bar by which the driver bar is held in a first position when said means is receiving power.

source—one or more sources of electromagnetic radiation or particles, emitted in all directions or as a beam.

Description

Embodiment One

Figure 1B:
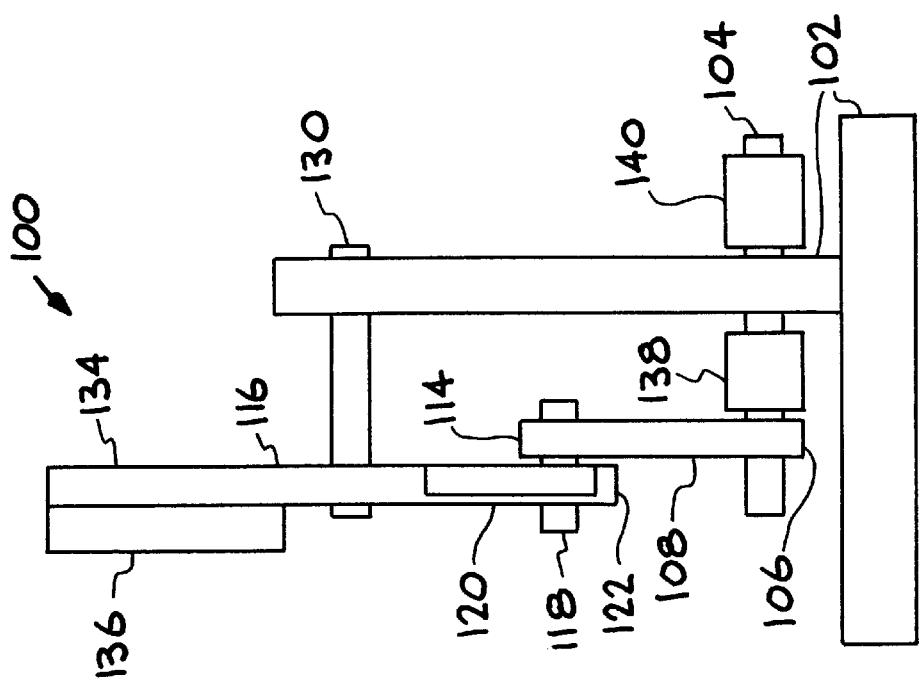
FIGS. 1A and 1B illustrate the front and side views for an embodiment of the present invention wherein powered restraining means and non-powered driving means operate on an output rod connected to the driver bar.
Figure 1A:
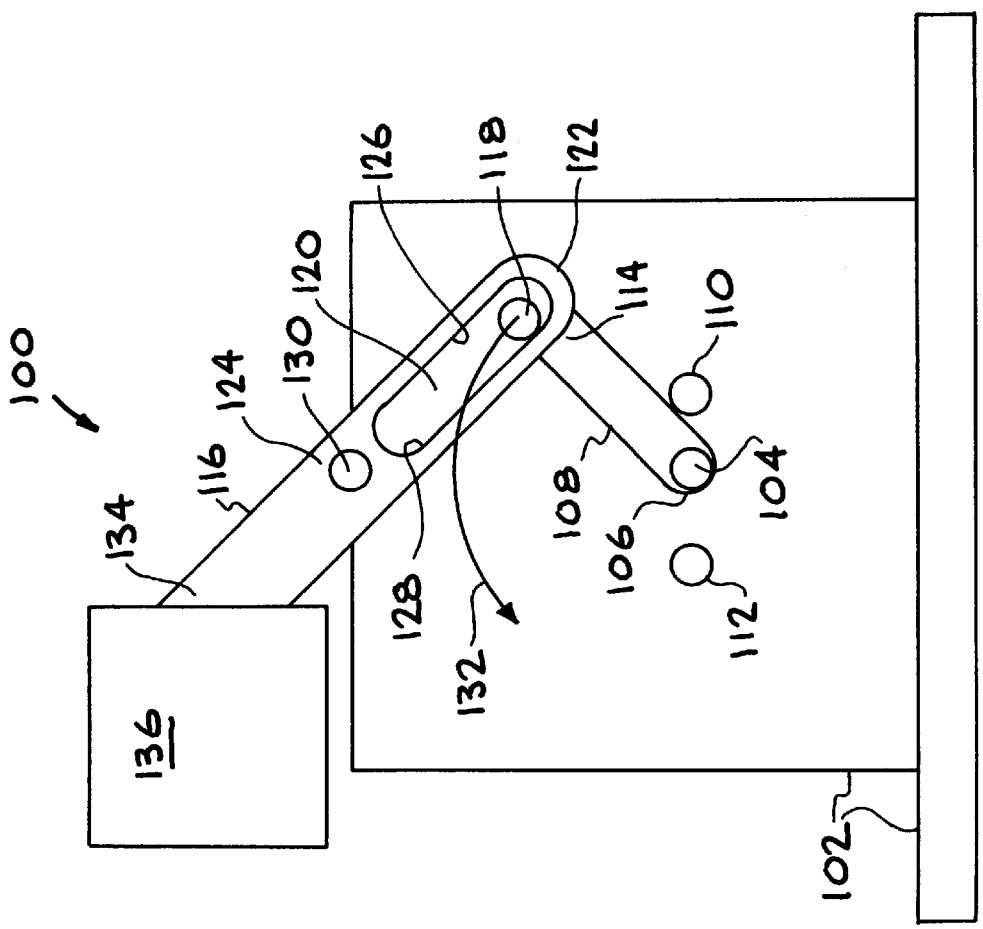

FIGS. 1A and 1B illustrate front and side views for an embodiment of the present invention. A two position optical element actuator device 100 of the present invention comprises a mounting base 102, a driver bar 108 having first and second ends, and an actuation arm 116 having first and second ends. The first end (driven end) 106 of driver bar 108 is connected via output rod 104 to mounting base 102. The second end (working end) 114 of driver bar 108 is mechanically linked to the actuation arm 116, by a bearing 118 that slides within an elongated slot 120 in the first end 122 (driven end) of actuation arm 116.

Powered means 140 applies a torsional restraining force to driver bar 108 via output rod 104 to hold driver bar 108 in a first position. Powered means 140 is preferably a rotary actuator, but may also include electric motors, electric engines, rotary solenoids and electromagnets. A preferred rotary actuator is part no. RA35A-2P12.9726 manufactured by Shindengen of Japan. Powered means 140 may also comprise electromagnets positioned relative to each other or to ferromagnetic materials, as is well known in the art, so that repulsive (or attractive) magnetic torsional forces are applied to driver bar 108.

Non-powered means 138 applies a torsional driving force to driver 108 via output rod 104 which causes driver bar 108 to pivot, from the driver bar's first position to a second position. Non-powered means 138 is preferably a helical torsion spring, but it is understood that the present invention encompasses configurations for the various other types of springs that are well known in the art, including but not limited to, helical tension and compression, belleville, leaf, extension, volute, and conical springs. If non torsional springs are utilized, it is understood that various means well known in the art would be needed to convert the linear force to rotational (torsional) force. Non-powered means 138 may also comprise one or more permanent magnet rotary solenoids. Non-powered means 138 may also comprise combinations of permanent magnets aligned with each other or with respect to ferromagnetic materials, so that repulsive (or attractive) magnetic forces cause said driver bar 108 to pivot.

Figure 1C:
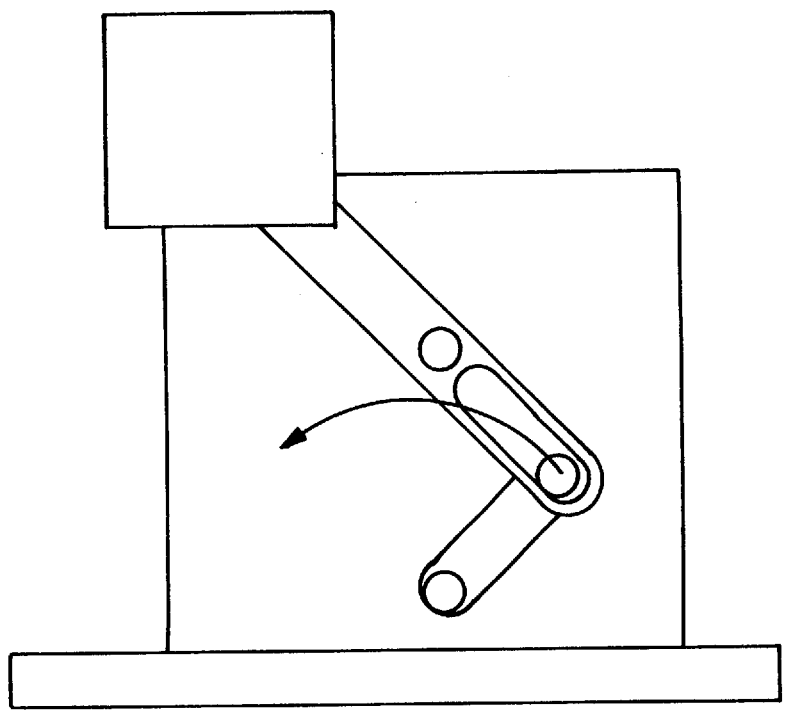
FIGS. 1C and 1D illustrate front views for the two positions for the driver bar for embodiments of the present invention as the driver bar is driven from the first position (1C) to the second position (1D).

As driver bar 108 pivots from the first position shown in FIG. 1C, bearing 118 is forced to slide within elongated slot 120 toward a middle portion 124 of actuation arm 116. As bearing 118 slides within elongated slot 120, bearing 118 exerts a force on either a wall 126 or a wall 128 of slot 120, causing actuation arm 116 to pivot about a pivot 130. As bearing 118 moves from one side to the other of device 100, bearing 118 travels in a path defined by a curved outline 132 shown in FIG. 1A. As driven end 122 of actuation arm 116 is forced to move to the left by bearing 118, the second end 134 (optical support end) of actuation arm 116 moves from the left, the position shown in FIG. 1C, to the right, the position shown in FIG. 1D. Mounted on the actuation arm second end 134 is an optical element 136. As actuation arm second end 134 moves from the position shown in FIG. 1C to the position shown in FIG. 1D, optical element 136 not only moves from left to right in an arc, but also rotates in a clockwise direction. Optical element 136 may be fixed or removably attached to actuation arm second end 134 by means well known in the art.

Figure 1D:
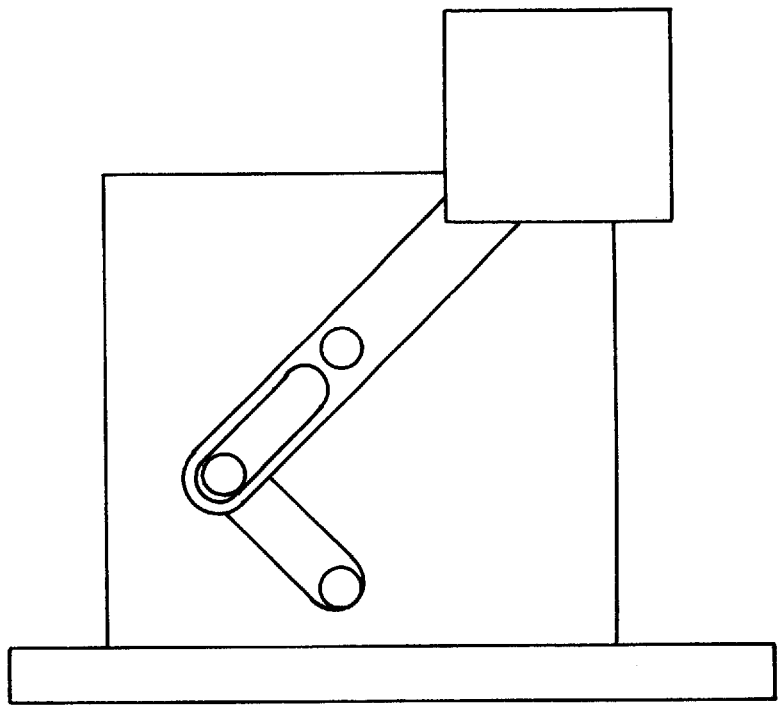

As shown in the embodiment of the present invention shown in FIGS. 1C and 1D, the driver bar and actuation arm are preferably at angle of 90° with respect to each other when the driver bar is in either of its first and second positions. Having the driver bar and actuation arm start at 90 degrees relative to each other means that the distance from the output rod to the bearing on the driver bar (length 1) is equal to the distance from the bearing to the actuation arm pivot (length 2). If length 1 is made shorter than length 2, then the driver bar would need to travel more than 90 degrees to meet the initial zero angular velocity criteria. The optical element would not move as fast nor rotate as much as in the 90 degrees case. Also, as can be seen in FIGS. 1C and 1D, pivoting the driver bar 90° causes the actuation arm to be pivoted 90° in the opposite rotational direction. By arranging the driver bar and actuation arm 90° to one another when the actuation is in the first position, when the driver bar is pivoted, the actuation arm is accelerated by the driver arm and bearing from zero angular velocity at the actuation arm first position, to a maximum angular velocity at 45° of rotation and then decelerated back to zero velocity at 90° of rotation, when the actuation arm reaches the second stationary position. This design locks the actuation arm in either the first or second positions until the actuation arm is pivoted in the reverse direction. It may also be noted that output rod 104 is aligned with pivot 130. The position of driver bar 108 may be detected via first and second position sensors 110 and 112 respectively.

Embodiment Two

Figure 2B:
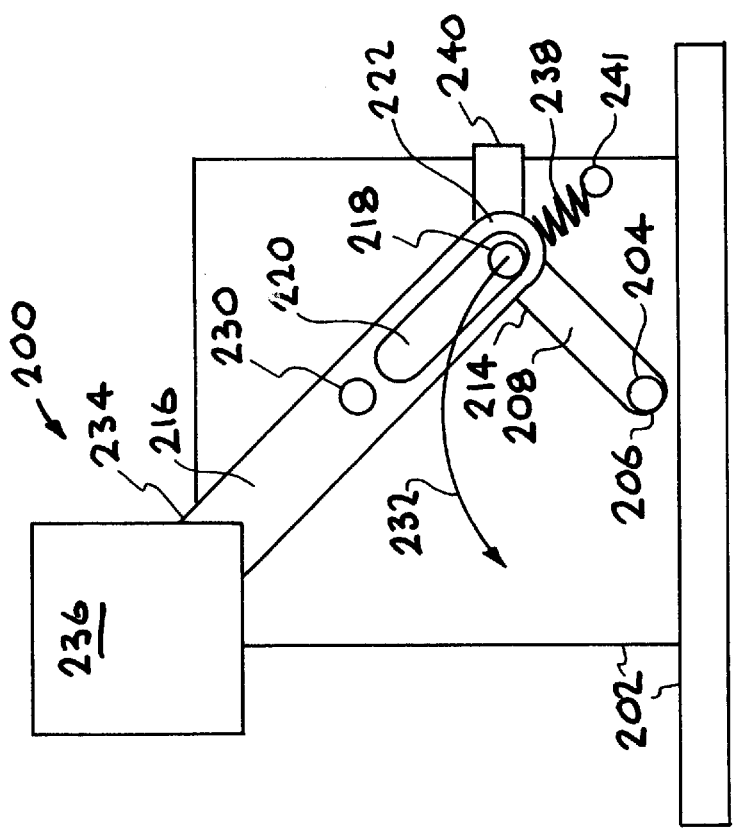
FIGS. 2A and 2B illustrate the front views for an embodiment of the present invention wherein the powered restraining means and non-powered driving means cooperate with the second end of the driver bar.
Figure 2A:
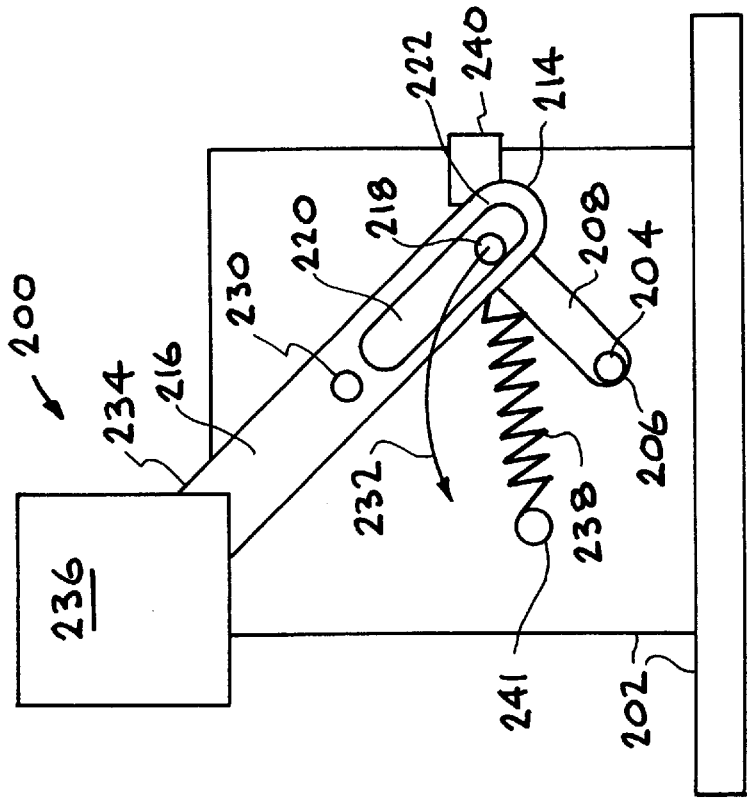

FIGS. 2A and 2B illustrate front views for a second embodiment of the present invention. A two position optical element actuator device 200 of the present invention comprises a mounting base 202, a driver bar 208 having first and second ends, and an actuation arm 216 having first and second ends. The first end (driven end) 206 of driver bar 208 is connected via output rod 204 to mounting base 202. The second end (working end) 214 of driver bar 208 is mechanically linked to the actuation arm 216, by a bearing 218 that slides within an elongated slot 220 in the first end 222 (driven end) of actuation arm 216. Mounted on the actuation arm second end 234 is an optical element 236.

Powered means 240 applies a restraining force to driver bar 208 at the working end 214 of driver bar 208 to hold driver bar 208 in a first position. The power source for powered means 240 may comprise electric, hydraulic or pneumatic power sources. The powered means 240 may comprise solenoids and electromagnets.

Non-powered means 238 applies a driving force to driver 208 at the working end 214 of driver bar 208 which causes driver bar 208 to pivot, from the driver bar's first position to a second position which causes actuation arm 216 to pivot about pivot 230. Non-powered means 238 comprises at least one spring attached to mounting base 202 via post 241, said spring being preferably a helical tension spring (FIG. 3A) or helical compression spring (FIG. 3B). It is understood that the present invention encompasses configurations for the various other types of springs that are well known in the art, including but not limited to helical torsional, belleville, leaf, extension, volute, and conical springs. Non-powered means 238 may also comprise pneumatic cylinders, and solenoids (permanent magnet).

Embodiment Three

Figure 3A:
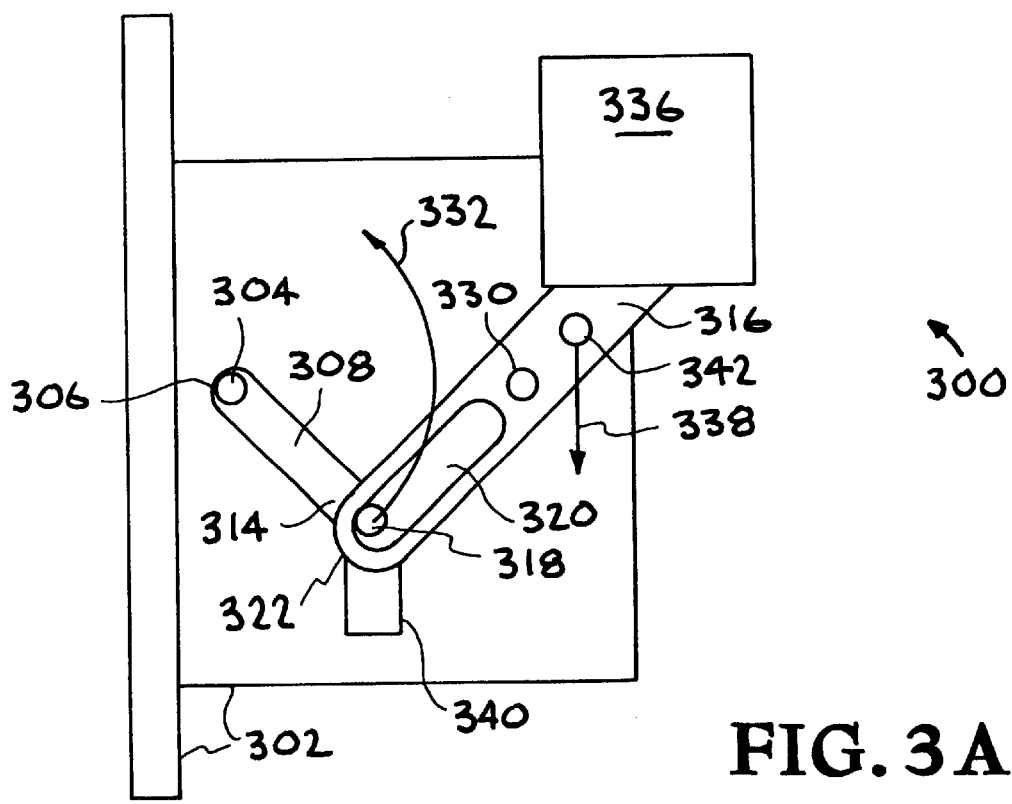
FIGS. 3A and 3B illustrate the front views for embodiments of the present invention wherein the non-powered driving means comprises gravity (3A) and gravity in conjunction with a spring (3B).
Figure 3B:
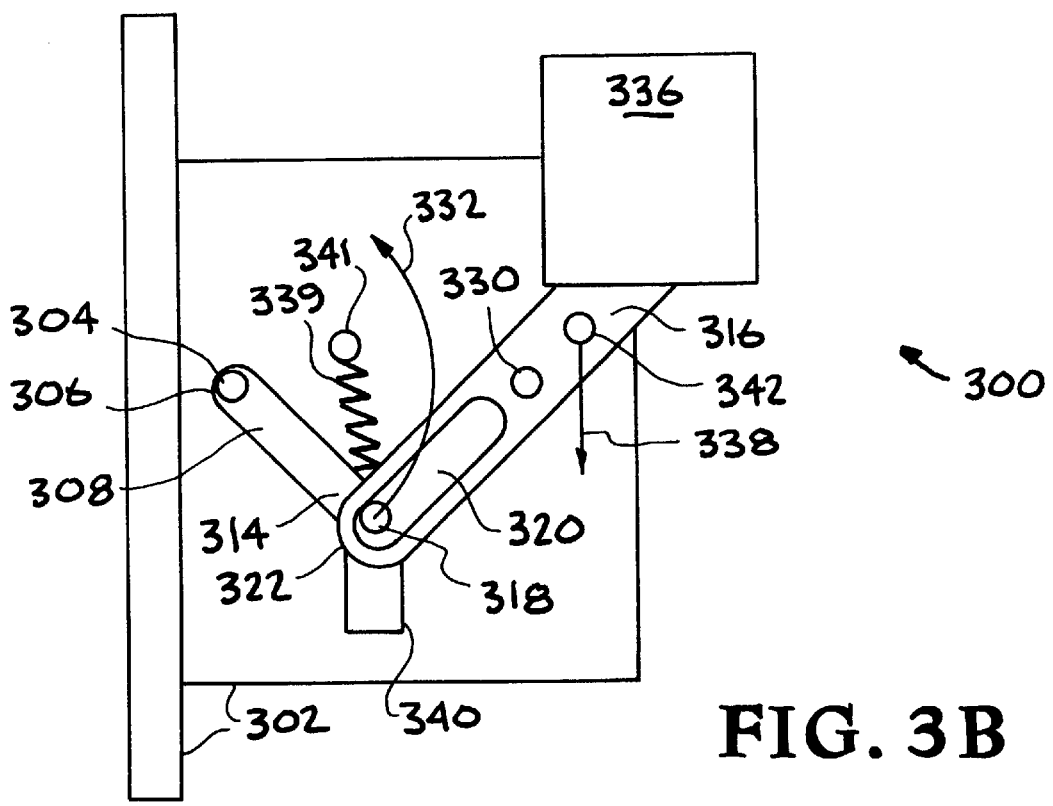

FIGS. 3A and 3B illustrate the front views for an embodiment of the present invention wherein the non-powered driving means 338 comprises gravity (FIG. 3A) and gravity in conjunction with additional non-powered means 339 (FIG. 3B). A two position optical element actuator device 300 of the present invention comprises a mounting base 302, a driver bar 308 having first and second ends, and an actuation arm 316 having first and second ends. The first end (driven end) 306 of driver bar 308 is connected via output rod 304 to mounting base 302. The second end (working end) 314 of driver bar 308 is mechanically linked to the actuation arm 316, by a bearing 318 that slides within an elongated slot 320 in the first end 322 (driven end) of actuation arm 316.

If the driver bar 308 and actuation arm 316 are initially at an angle less than 90 degrees with respect to each other in position one, then the composite center of gravity (CG) 342 for the optical element 336 and actuation arm 316 may be located so that gravity acting alone on the CG 342 will drive the driver bar 308 from position one to position two. If the driver bar 308 and actuation arm 316 are at an angle equal to 90 degrees with respect to each other in position one, then an additional non-powered means 339, (preferably a spring) is needed in conjunction with gravity acting on the CG 342 to drive the driver bar 308 from position one to position two. The additional non-powered means 339 may be located to apply the driving force to driver bar 308 via output rod 304, or to the working end of driver bar 308. The additional non-powered means 339 (shown in FIG. 3B attached to mounting base 302 via post 341) may be sized to provide only the force sufficient to urge the driver bar 308 and actuation arm 316 to be less than 90 degrees with respect to each other at which point gravity acting on CG 342 will take over. It is understood that the present invention encompasses configurations for the various types of springs that are well known in the art, including but not limited to helical (tension, compression, torsional), belleville, leaf, extension, volute, and conical springs. Besides springs, non-powered means 339 may also comprise a permanent magnet solenoid, or a set of permanent magnets so located such that the repulsive force from the magnets urges the relative angle between the driver bar 308 and the actuation arm 316 to be less than 90 degrees.

Embodiment Four

Figure 4A:
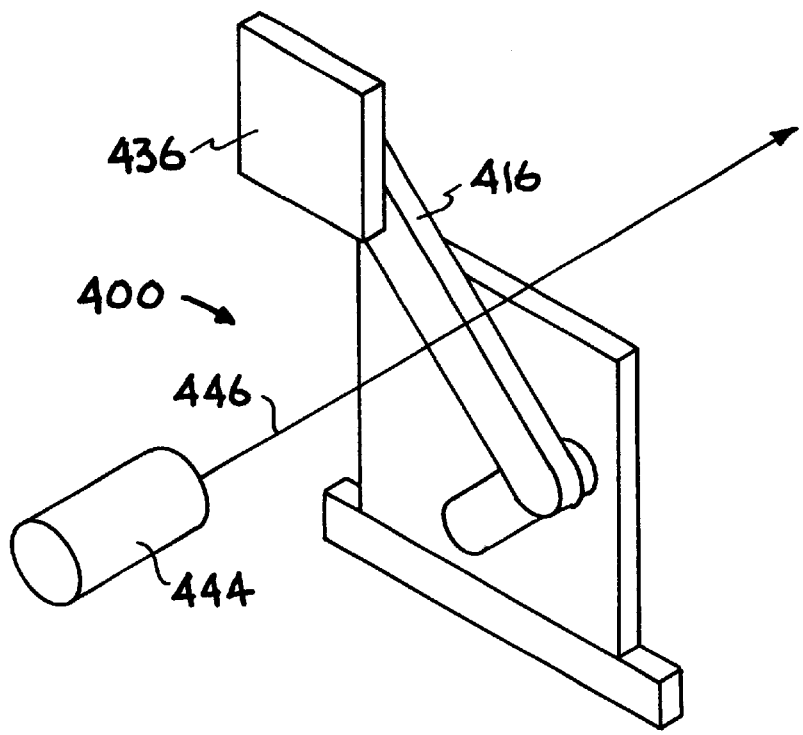
FIGS. 4A and 4B illustrate an aspect of the present invention which further comprises a source emitting electromagnetic radiation or particles. In 4A, the optical element does not intercept the emission when the actuation arm is held in the first position by a powered means, and in 4B, the optical element intercepts at least a portion of the emission when the actuation arm is moved to the second position by a non-powered means.
Figure 4B:
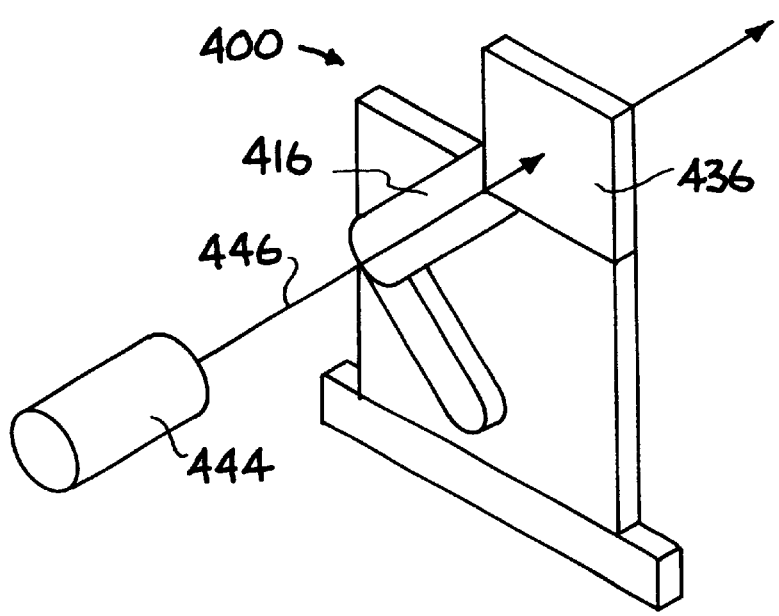

FIGS. 4A and 4B illustrate an aspect of the present invention comprising a two position optical element actuator device 400 cooperating with a source 444 (preferably a beam source) emitting EM radiation or particles. In FIG. 4A, the optical element 436 does not intercept source emission 446 from said source 444 while the actuation arm 416 is held in the first position by various powered means (as described earlier). As shown in FIG. 4B, when the powered means (not shown) ceases to restrain the driver bar, the optical element 436 does intercept at least a portion of source emission 446 when the actuation arm 416 is moved to the second position by various non-powered means (as described earlier). One application of this embodiment would be as a safety shutter, wherein the optical element is a shield that moves into the path of a beam blocking the transmission of the beam.

Embodiment Five

Figure 5A:
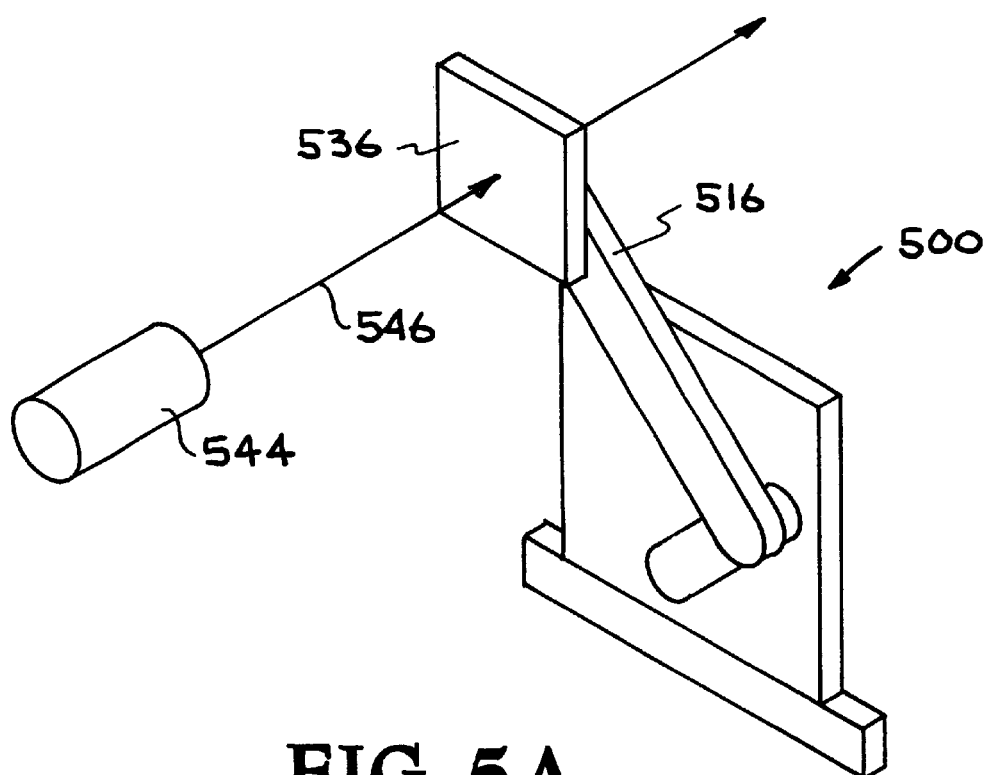
FIGS. 5A and 5B illustrate an aspect of the present invention which further comprises a source emitting electromagnetic radiation or particles. In 5A, the optical element intercepts at least a portion of the emission when the actuation arm is held in the first position by a powered means, and in 5B, the optical element does not intercept the emission when the actuation arm is moved to the second position by a non-powered means.
Figure 5B:
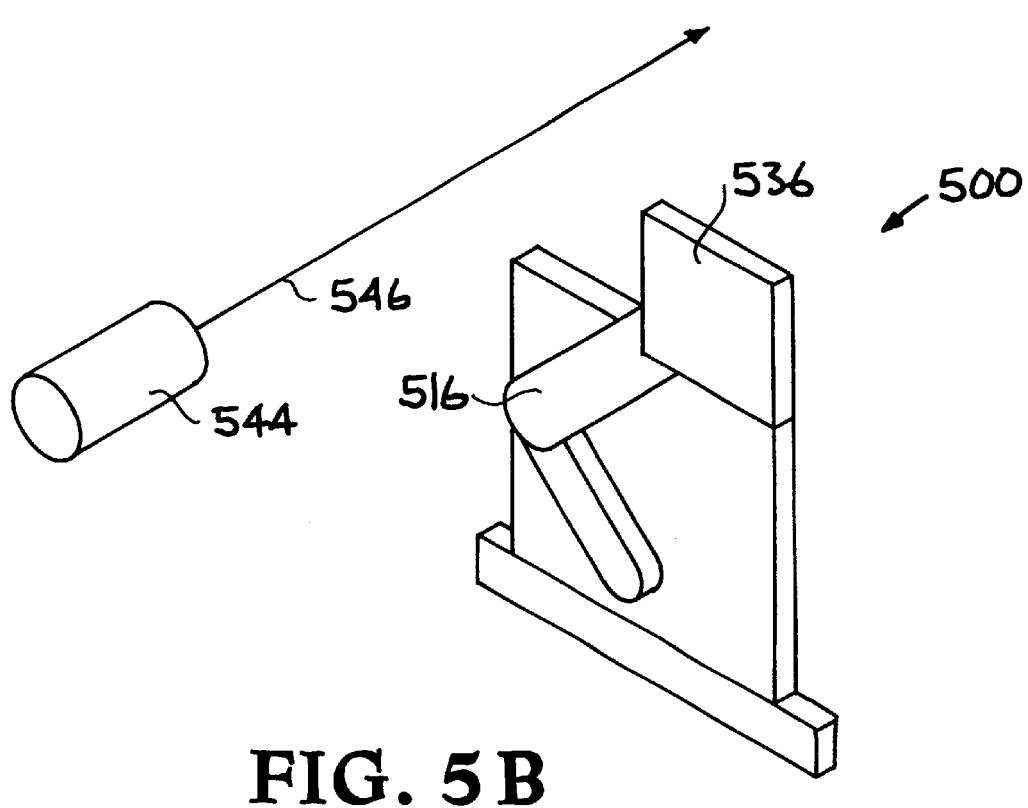

FIGS. 5A and 5B illustrate an aspect of the present invention comprising a two position optical element actuator device 500 cooperating with a source 544 (preferably a beam source) emitting EM radiation or particles. In FIG. 5A, the optical element 536 intercepts at least a portion of source emission 546 while the actuation arm 516 held in the first position by various powered means (as described earlier). As shown in FIG. 5B, when the powered means (not shown) ceases to restrain the driver bar, the optical element 536 does not intercept source emission 546 when the actuation arm 516 is moved to the second position by various non-powered means (as described earlier). One application of this embodiment would be as a switch, wherein the optical element is a shield which moves out of the path of a beam.

Embodiment Six

Figure 6A:
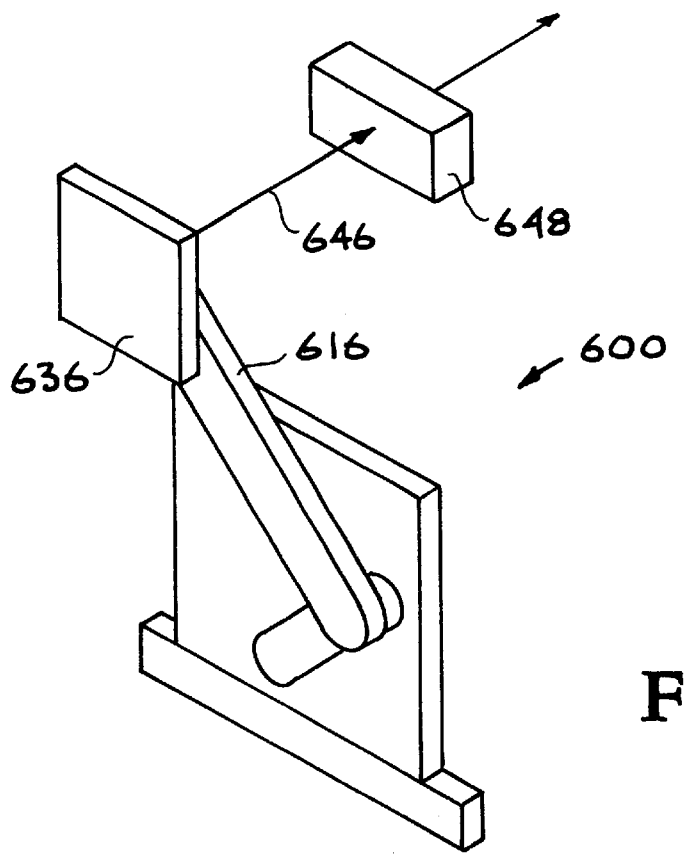
FIGS. 6A and 6B illustrate an aspect of the present invention comprising a first optical element which comprises a source emitting EM radiation or particles, and a second optical element. In 6A, at least a portion of the emission is intercepted by the second optical element while the actuation arm is held in the first position by a powered means, and in 6B, the emission is not intercepted by the second optical element when the actuation arm is moved to the second position by a non-powered means.
Figure 6B:
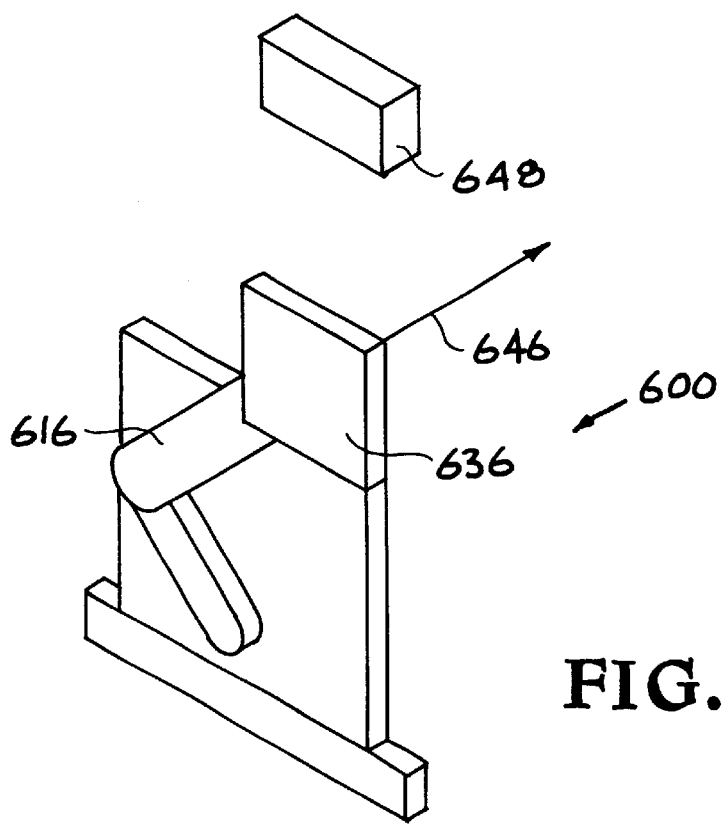

FIGS. 6A and 6B illustrate an aspect of the present invention comprising a two position optical element actuator device 600 in which optical element 636 comprises a source (preferably a beam source) of EM radiation or particles whose emission 646 impinges on a second optical element item 648. In FIG. 6A, the second optical element 648 intercepts at least a portion of the source emission 646 while the actuation arm 616 is held in the first position by various powered means (as described earlier). In FIG. 6B, when the actuation arm 616 is moved to the second position by various non-powered means (as described earlier), the second optical element 648 no longer intercepts the source emission 646. If the source 636 is not a beam source, then additional shielding (not shown) may be needed to shield the second optical 648 when the actuation arm is moved to position two.

Embodiment Seven

Figure 7A:
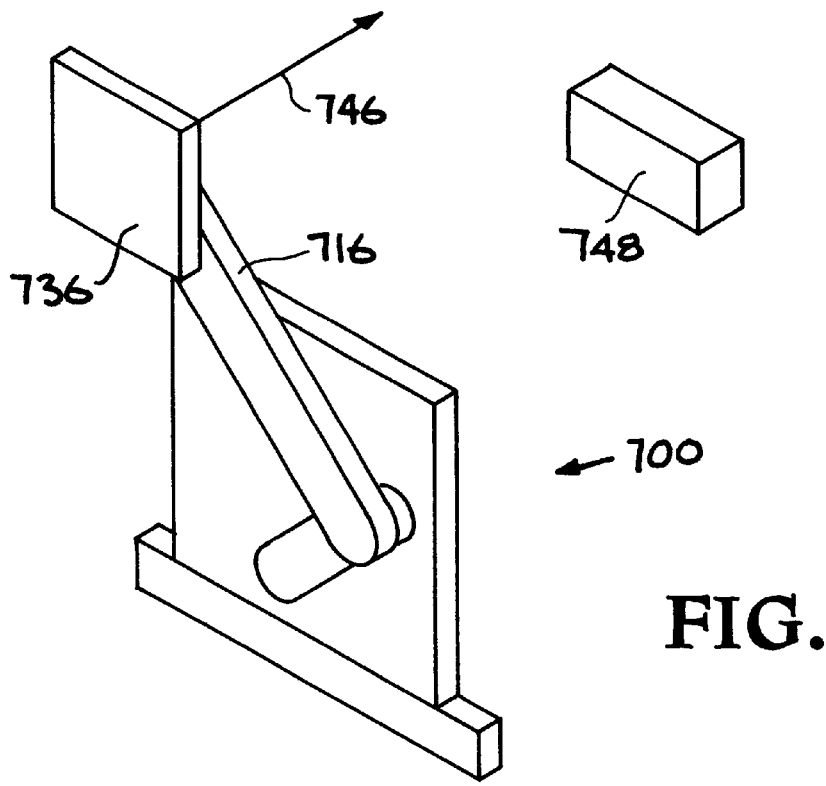
FIGS. 7A and 7B illustrate an aspect of the present invention comprising a first optical element which comprises a source emitting EM radiation or particles, and a second optical element. In 7A, the emission is not intercepted by the second optical element while the actuation arm is held in the first position by a powered means, and in 7B, at least a portion of the emission is intercepted by the second optical element when the actuation arm is moved to the second position by a non-powered means.
Figure 7B:
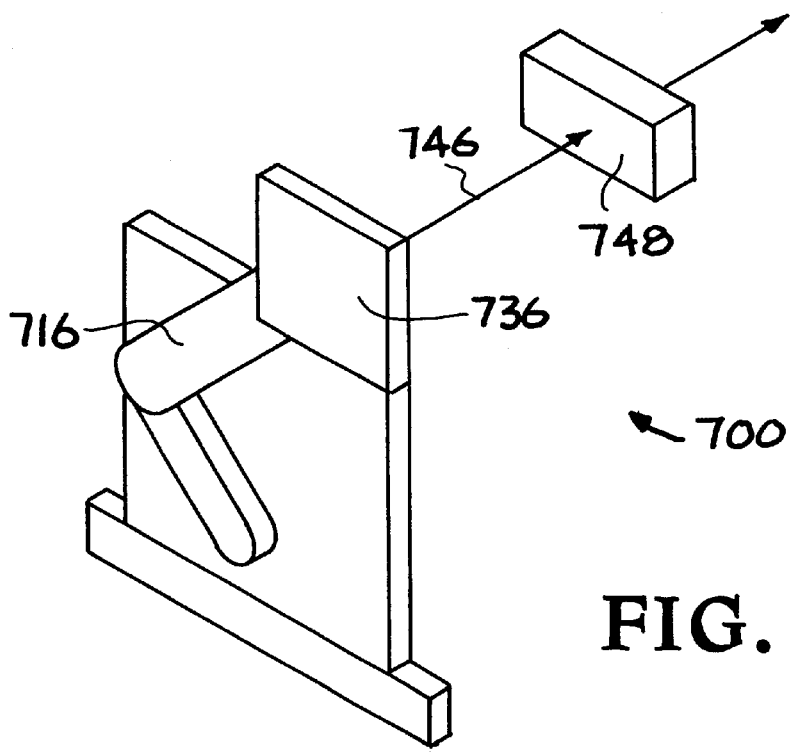

FIGS. 7A and 7B illustrate an aspect of the present invention comprising a two position optical element actuator device 700 in which optical element 736 comprises a source (preferably a beam source) of EM radiation or particles whose emission 746 impinges on a second optical element item 748. In FIG. 7A, the second optical element 748 does not intercept the source emission 746 while the actuation arm 716 is held in the first position by various powered means (as described earlier). In FIG. 7B, when the actuation arm 716 is moved to the second position by various non-powered means (as described earlier), the second optical element 748 intercepts at least a portion of the source emission 746. If the source 736 is not a beam source, then additional shielding (not shown) may be needed to shield the second optical 748 when the actuation arm is in position one.

It is understood that in embodiments 1–3, the optical element may comprise any of the optical elements as defined earlier. In embodiments 4 and 5, the optical element is a non-source optical element. In embodiments 6 and 7, the first optical element is a source, and the second optical element is a non-source optical element.

In the various embodiments described there are various scenarios in which the powered means ceases to hold (or restrain) the driver bar in the first position. A possible scenario is where the powered means ceases to receive power. This would include power failures, and intentional and unintentional shutoffs. Other scenarios include mechanical failure or breakdown of the restraining means. Other scenarios include external forces applied to the powered means causing it to lose contact with the driver bar (due to excessive vibration or earthquake).

In general, the mounting base of the present invention serves as a platform to which the components of the optical actuator device of the present invention are secured. The mounting base may be made of metal, or another sufficiently strong, non-deformable material.

The driver bar of the present invention is a component to which restraining and driving forces are applied. The driver bar may be made of metal, or other strong, non-deformable material.

The actuation arm of the present invention is the portion of the optical actuator device that is driven by the driver bar and pivots in an opposite rotational direction. The actuation arm is preferably made of a strong, non-deformable material, most preferably a machinable, high-strength plastic such as DELRIN.

Obviously numerous modifications and variations of the present invention are possible in the light of the above teachings. It is therefore to be understood that within the scope of the appended claims the invention may be practiced otherwise than as specifically described therein.

What is claimed is:

1. A two position optical actuator device, comprising:
   a mounting base;
   an actuation arm having a first end, a second end, and a middle region, said middle region being rotatably connected to said mounting base, said first end including an elongated opening;
   an optical element attached to said actuation arm second end;
   a driver bar, having a first end rotatably connected to said mounting base and a second end on which is mounted a bearing for engaging and traveling within said elongated opening, for driving said actuation arm between actuation arm first and second positions when said driver bar pivots from driver bar first and second positions, so that when said driver bar pivots in a given direction said actuation arm is driven in an opposite rotational direction by said bearing;
   powered means for applying a restraining force to said driver bar to hold said driver bar in driver bar first position; and
   non-powered means for applying a driving force to said driver bar which causes said driver bar to pivot from said driver bar first position to driver bar second position when said powered means ceases to apply said restraining force to said driver bar.

2. The device of claim 1, wherein:
   said driver bar and actuation arm are at a relative angle of 90 degrees with respect to each other when said actuation arm is in said actuation arm first position.

3. The device of claim 2, wherein:
   said non-powered means comprises gravity acting directly on the composite center of gravity of the actuation arm and optical element, which urges pivoting of said driver bar from driver bar position one to position two; and
   further comprising a second non-powered means, wherein said second non-powered means acts on said driver bar to urge pivoting of said driver bar to less than a relative angle of 90 degrees with respect to said actuation arm.

4. The device of claim 1, wherein:

said driver bar and said actuation arm are at a relative angle of less than 90 degrees with respect to each other when said actuation arm is in said actuation arm first position;

and said non-powered means utilizes gravity acting directly on the composite center of gravity of the driver bar, actuation arm and optical element, which urges pivoting of said driver bar from driver bar position one to position two.

5. The device of claim 1, wherein:

said non-powered means comprises at least one spring or combination of springs selected from the group consisting of compression, extension, torsion, helical, belleville, extension, volute, conical and leaf springs.

6. The device of claim 1, wherein:

said non-powered means is selected from the group consisting of permanent magnets, permanent magnets/ferromagnetic materials combinations, and permanent magnet solenoids.

7. The device of claim 1, wherein:

said non-powered means is a pneumatic cylinder or pneumatic solenoid.

8. The device of claim 1, wherein:

said powered means is selected from the group consisting of electromagnets, electromagnets/ferromagnetic materials combinations, and electromagnetic solenoids.

9. The device of claim 1, wherein:

said powered means comprises means to apply rotational force to said driver bar first end selected from the group consisting of motors, engines and rotary actuators.

10. The device of claim 1, wherein:

said optical element is a source emitting EM radiation or particles.

11. The device of claim 10, wherein:

said source is a beam source.

12. The device of claim 1, wherein:

said optical element is an instrument capable of measuring, sensing or detecting EM radiation or particles.

13. The device of claim 1, wherein:

said optical element is an element capable of reflecting, transmitting or absorbing EM radiation or particles.

14. The device of claim 13, wherein:

said optical element is selected from the group consisting of shields, mirrors, lenses, filters, collimators, absorbing glass, polarizers, polarization rotating elements, prisms, and alignment fiducials.

15. The device of claim 1, further comprising:

a source emitting EM radiation or particles;

and wherein at least a portion of said source's emission is intercepted by said optical element.

16. The device of claim 15, wherein:

said source is a beam source.

17. The device of claim 15, wherein:

said source's emission is intercepted by said optical element in said actuation arm second position, and said source's emission is not intercepted by said optical element in said actuation arm first position.

18. The device of claim 15, wherein:

said source's emission is intercepted by said optical element in said actuation arm first position, and said source's emission is not intercepted by said optical element in said actuation arm second position.

19. The device of claim 1, further comprising:

a second optical element;

wherein said first optical element is a source emitting EM radiation or particles;

and wherein said second optical element intercepts at least a portion of said source emission.

20. The device of claim 19 wherein:

said source is a beam source.

21. The device of claim 19 wherein:

said second optical element intercepts at least a portion of said source emission in said actuation arm second position and does not intercept said source emission in said actuation arm first position.

22. The device of claim 19 wherein:

said second optical element intercepts at least a portion of said source emission in said actuation arm first position and does not intercept said source emission in said actuation arm second position.

23. The device of claim 1 further comprising: at least one position sensor positioned relative to said driver bar to detect when said driver bar is in said driver bar first and second positions.

* * * * *